US010920752B2

(12) United States Patent
Vcelka et al.

(10) Patent No.: US 10,920,752 B2
(45) Date of Patent: Feb. 16, 2021

(54) NACELLE FOR A WIND TURBINE AND A WIND TURBINE

(71) Applicant: Vestas Wind Systems A/S, Aarhus N. (DK)

(72) Inventors: Martin Patrick Vcelka, Gjern (DK); Matthieu Alexandre, Brabrand (DK)

(73) Assignee: Vestas Wind Systems A/S, Aarhus N. (DK)

( * ) Notice: Subject to any disclaimer, the term of this patent is extended or adjusted under 35 U.S.C. 154(b) by 40 days.

(21) Appl. No.: 16/470,397

(22) PCT Filed: Dec. 4, 2017

(86) PCT No.: PCT/DK2017/050405
§ 371 (c)(1),
(2) Date: Jun. 17, 2019

(87) PCT Pub. No.: WO2018/113867
PCT Pub. Date: Jun. 28, 2018

(65) Prior Publication Data
US 2020/0109702 A1 Apr. 9, 2020

(30) Foreign Application Priority Data
Dec. 22, 2016 (DK) ................................ 2016 71021

(51) Int. Cl.
*F03D 80/60* (2016.01)
*F03D 80/50* (2016.01)
(52) U.S. Cl.
CPC ............. *F03D 80/60* (2016.05); *F03D 80/50* (2016.05); *F05B 2240/14* (2013.01)

(58) Field of Classification Search
CPC ....... F03D 80/50; F03D 80/60; F05D 2240/14
See application file for complete search history.

(56) References Cited

U.S. PATENT DOCUMENTS 8,890,348 B2 * 11/2014 Munk-Hansen ........ F03D 13/10
290/44
9,133,826 B2 * 9/2015 Munk-Hansen ........ F03D 80/60
(Continued)

FOREIGN PATENT DOCUMENTS

CN 201381947 Y 1/2010
CN 102052262 A 5/2011
(Continued)

OTHER PUBLICATIONS

Danish Patent and Trademark Office, Search and Examination Report in PA 2016 71021, dated Jun. 28, 2017.
(Continued)

*Primary Examiner* — Eldon T Brockman
*Assistant Examiner* — Michael K. Reitz
(74) *Attorney, Agent, or Firm* — Wood Herron & Evans LLP

(57) ABSTRACT

A nacelle for a wind turbine, the nacelle comprising a roof panel forming an opening into an internal space; a cooling arrangement extending upwards from the roof panel; and a closure movable between an open position revealing the opening and a closed position closing the opening. To enable easy parking of the closure and particularly to enable parking of the closure in a position where it does not occupy a large surface space on the roof panel, the nacelle further comprises a track configured to guide the closure between the open and the closed positions, the track being carried at least partly by the cooling arrangement.

20 Claims, 4 Drawing Sheets

(56) References Cited

U.S. PATENT DOCUMENTS

| | | | |
|---|---|---|---|
| 2011/0097202 A1 | 4/2011 | de Buhr et al. | |
| 2013/0315735 A1* | 11/2013 | Arndt | F03D 80/00 416/146 R |
| 2015/0132119 A1 | 5/2015 | Fenger | |
| 2016/0237986 A1 | 8/2016 | Abolfazlian et al. | |

FOREIGN PATENT DOCUMENTS

| | | |
|---|---|---|
| CN | 105508154 A | 4/2016 |
| EP | 1677000 A2 | 7/2006 |
| EP | 1677001 A2 | 7/2006 |
| EP | 2759701 A1 | 7/2014 |
| KR | 101638012 B1 | 7/2016 |
| WO | 2012105971 A1 | 8/2012 |

OTHER PUBLICATIONS

European Patent Office, International Search Report and Written Opinion in PCT Application No. PCT/DK2017/050405, dated Feb. 26, 2018.

China National Intellectual Property Administration, First Notification of Office Action in CN Application No. 201780079512.3, dated Mar. 24, 2020.

* cited by examiner

NACELLE FOR A WIND TURBINE AND A WIND TURBINE

INTRODUCTION

The invention relates to a nacelle for a wind turbine and a wind turbine with a tower and a nacelle. The invention further relates to a method of providing access to an internal space in a nacelle.

BACKGROUND

Wind turbines normally comprise a rotor with blades and arranged to rotate by wind energy. The rotor drives a drive train which typically includes a generator which converts the energy to electricity. The drive train may include a gearbox, or the generator may be directly driven by the rotor.

The drive train is housed in a nacelle which is typically rotationally attached to a tower. In a traditional horizontal axis wind turbines, the nacelle is placed on top of the vertical tower carried by a bearing allowing the nacelle to rotate in a horizontal plane to thereby face the direction of the wind. Access to the interior of the nacelle for inspection and maintenance is typically through the interior of the tower. Additionally, wind turbines may have one or more skylight openings in the roof of the nacelle. Such openings serve for maintenance external to the nacelle, for ventilation and in limited amount for bringing spare parts into or out of the nacelle.

Due to the location in high altitude, and particularly due to the risk of accidents, handling of the skylight is limited, and it may become entangled in hoisting robes etc. when spare parts are brought into and out of the nacelle.

DESCRIPTION OF THE INVENTION

It is an object to facilitate improved access to the interior of a nacelle, and particularly to enable increased communication of spare parts through an opening in the roof of the nacelle. Further, it is an object to increase safety in handling parts through the opening and to increase safety during opening and closing of the opening in the roof. According to this and other objects, the disclosure provides a nacelle for a wind turbine, the nacelle comprising:
 a roof panel forming an opening into an internal space;
 a cooling arrangement extending upwards from the roof panel;
 a closure movable between an open position revealing the opening and a closed position closing the opening; and
 a track configured to guide the closure between the open and the closed positions,
wherein the track is carried at least partly by the cooling arrangement.

Due to the track which guides the closure, the closure may have a large size and still be opened safely and easily.

The cooling arrangement may be constituted by one or more heat exchangers, e.g. for air to liquid heat exchange, or it may be constituted by a housing which includes one or more heat exchangers. The cooling arrangement may generally be any kind of structure on the outer surface of the roof and configured for cooling purpose, e.g. for cooling lubrication oil of a gearbox, for cooling electronic components, or for cooling a power generator. The cooling arrangement may be located on the roof and it may extend in an upward direction from the roof panel.

In one embodiment, the cooling arrangement is a heat exchanger, e.g. a traditional radiator, which is placed on the roof of the nacelle without any housing or shielding. The heat exchanger may be supported only at the base where it is attached to the roof, or it may include stays or stiffening structures of different kinds. In this embodiment, the track may increase the strength and/or stiffness of the construction and protect the free-standing heat exchanger.

In another embodiment, the cooling arrangement is a pair of wings arranged upright on each side of a heat exchanger or a housing, e.g. a housing forming a duct where one or more heat exchangers are arranged. The housing thereby shields the heat exchanger. The duct may increase the wind speed and thereby the heat exchange. The track may be fixed to the wings, to the housing, and/or to the heat exchanger in the housing and may thereby increase the strength and/or stiffness of the construction.

In one embodiment, the cooling arrangement comprises one or more flow ducts arranged above the roof and configured to guide a stream of out-door air into the nacelle for cooling purpose in the nacelle. In This embodiment, the track could be attached to the flow duct and thereby increase the strength and/or stiffness of the construction.

By the specification of the track being carried at least partly by the cooing arrangement is herein meant that the track and cooling arrangement are joined to support each other. Accordingly, the cooling arrangement could be supported by the track and/or the track could be supported by the cooling arrangement.

Since the track is carried at least partly by the cooling arrangement, the closure may come close to the cooling arrangement when in the open position, which saves space on the roof, and additionally, the structure of the track and the structure of the cooling arrangement may support each other thereby further saving space and weight on the nacelle roof.

The space on the roof of the nacelle is limited. Additionally, the roof of the nacelle may be used e.g. for safety lights, antennas, cooling arrangements and other purpose. To save space and thus allow for a larger opening size relative to the size of the roof, the track may be configured to guide the closure such that it moves sideways in a horizontal plane and rotates about a horizontal axis. By this combination, the closure can move away from the opening and rotate. By the sideways movement and rotation, the closure can expose the opening completely and yet take only limited amount of space on the roof of the nacelle. Accordingly, the disclosure facilitates installation of components through the roof of the nacelle, and even very large components, e.g. a complete drive train, may be installed from above through the opening.

The closure may e.g. rotate from an essentially horizontal orientation to an upwards or downwards orientation, e.g. an essentially vertical orientation, and move sideways until the closure is located next to the opening. The combined movement may particularly be a simultaneous movement of the closure.

In the beginning of the opening procedure, i.e. when beginning the movement away from the closed position, the movement may particularly be a sideways, horizontal movement. For that purpose, the track may have a first section extending essentially horizontally along an upper surface of the roof panel. Once the opening is not any longer sealed by the closure, i.e. when a small opening is established, low pressure condition in the nacelle is prevented, and the closure may start to rotate from the essentially horizontal orientation to an upright orientation. For this purpose, a second section of the track may extend up- or downwardly, or even essentially vertically. This movement may e.g. be along a rear surface or a side-surface of the nacelle. In that way, the closure is completely out of the way and leaves the roof and the opening free. The second section of the track which effects upwards movement may particularly be along the cooling arrangement.

The track may have a curved section being between the first and second sections.

As mentioned previously, the cooling arrangement may comprise at least one heat exchanger. In this embodiment, the distance from the track to the heat exchanger may be larger at a position close to the roof panel than at a position further away, i.e. above the roof panel. Particularly, the heat exchanger may be vertical and the track may extend at an angle to vertical such that the track, the heat exchanger and the roof panel forms a triangular shape illustrated in FIG. 7. In this shape, the base of the triangle, by definition herein is along the roof panel. The length of the base, i.e. the distance between the heat exchanger and the track near the roof panel may particularly be shorter than the altitude, where the altitude is typically the height over the roof panel, where the track would meet the heat exchanger if the length of the heat exchanger and track were extended until they meet. In one embodiment, the altitude is in the range of 5-20 times longer than the base, and the angle of the track to vertical may be between 5 and 25 degrees.

When the closure is guided towards the open position, the track may guide the closure towards the cooling arrangement, particularly such that the closure at least partly covers a surface of the cooling arrangement when in the open position. Particularly, the closure may cover a wind passage through the cooling arrangement and thus reduce the wind through the cooling arrangement.

The covering of the cooling arrangement may have the effect that the cooling arrangement is protected by the closure when the closure is in the open position. I.e. when the nacelle is open and items are lifted into or out of the nacelle, the cooling arrangement is protected by the closure, and damage on the cooling arrangement e.g. caused by collision between items being hauled out of the nacelle can be prevented. Additionally, the workers and the items being handled through the opening can be protected by the closure against the relatively high wind speeds which are sometimes experienced due to a tunnelling effect sometimes created through the cooling arrangement. I.e. by the at least partly covering of the cooling arrangement by the closure, the wind through the cooling arrangement can be prevented thereby protecting the workers etc.

In one embodiment, the closure completely covers a wind passage through the cooling arrangement.

The nacelle for a wind turbine typically forms a forward end with an opening for a rotor shaft to enter the nacelle and an opposite rearward end. In such wind turbines, the opening according to the present disclosure may be between the cooling arrangement and the rearward end, or the opening may be between the cooling arrangement and the forward end.

The cooling arrangement may be closer to the rearward end than to the forward end.

The closure may comprise a panel configured to cover the opening. The panel may include resilient edges forming a gasket which seals against the edge about the opening in the roof. The closure may further include at least a first set of guides configured to follow the track and a second set of guides configured to follow the track, the first set of guides being offset from the second set of guides along the track, and the first and second set of guides being rotationally attached to the panel. By rotationally attached is meant that the guides are fixed to the panel but allowed to rotate relative to the panel. This allows the panel to rotate relative to the track. In one embodiment, the guides are not allowed to rotate freely relative to the panel but may rotate together with the panel in response to the shape of the track.

The interface between the panel and the track may e.g. be constituted by a trolley in the form of a rigid element attachable to the panel and having guides attached thereto.

In one embodiment, the guides are constituted by wheels or rolls attached via rotational bearings to the rigid element, and the rigid element may be attached movably to the panel or it may be fixed non-movably to the panel. These trolleys run in the track by their wheels and are guided by the track. They may particularly be locked to the track to thereby prevent the panel from falling down from the nacelle.

In one embodiment, the rigid element is connected by a bolt or a pin to the panel. This bolt or pin essentially locks the panel to the track and only allows movement along the track. This means that the movement of the panel is dictated by the shape of the track.

Additionally, or alternatively, at least one of the first set of guides and the second set of guides is slidingly attached to the panel. By slidingly attached is herein meant that the guides are fixed to the panel but allowed to slide relative to the panel, e.g. in an upwards/downwards direction relative to the panel. This allows the panel to be shifted upwards e.g. for initiating the opening procedure by an upwards movement preventing contact between the panel and the edge about the opening thereby making the sliding movement easier.

The track may e.g. be formed by a U-shaped, C-shaped, or I-shaped profile e.g. made of plastic or metal, e.g. aluminium. The guides could be formed by rollers arranged to roll in the U-shaped, C-shaped, or I-shaped profile.

The nacelle may comprise at least two side panels forming outer sidewalls of the nacelle, and a roof panel forming the roof of the nacelle. The closure may extend all the way across the roof from one of the side panels to the other of the side panel to thereby provide an opening having a width corresponding to the width of the nacelle from the inner surface of one side panel to the inner surface of the opposite side panel. In this embodiment, the closure may comprise bend edge-portions extending downwards along an outer surface of the side panels. This provides an improved seal and strengthens the structure when the closure is in the closed position.

The roof panel may comprise two separate roof panel sections on opposite sides of the closure such that the closure forms a central roof panel between the two separate roof panels.

To provide a large size of the opening and good support for the closure during opening and closing, the roof panel may, in the closed position, be carried by an edge about the opening, and the track may begin at the opening and extend from the opening in a direction away from the opening such that the track does not extend into the opening. In that way, passage of items through the opening is unhindered by the track.

Particularly, the track may comprise two track sections extending e.g. in parallel at a distance being less than the distance between the opposite edges on which the closure rests in the closed position.

In a second aspect, the disclosure provides a wind turbine comprising a nacelle according to the above disclosure.

In a third aspect a method is disclosed for providing access to an internal space in a nacelle as described above. The method comprises moving the closure from the closed position to the open position and thereby limiting airflow across the cooling arrangement.

Particularly, the method may include the use of a nacelle according to the first aspect, with any of the features mentioned relative to the nacelle.

BRIEF DESCRIPTION OF THE DRAWINGS

The invention will now be described in further details with reference to the accompanying drawings in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
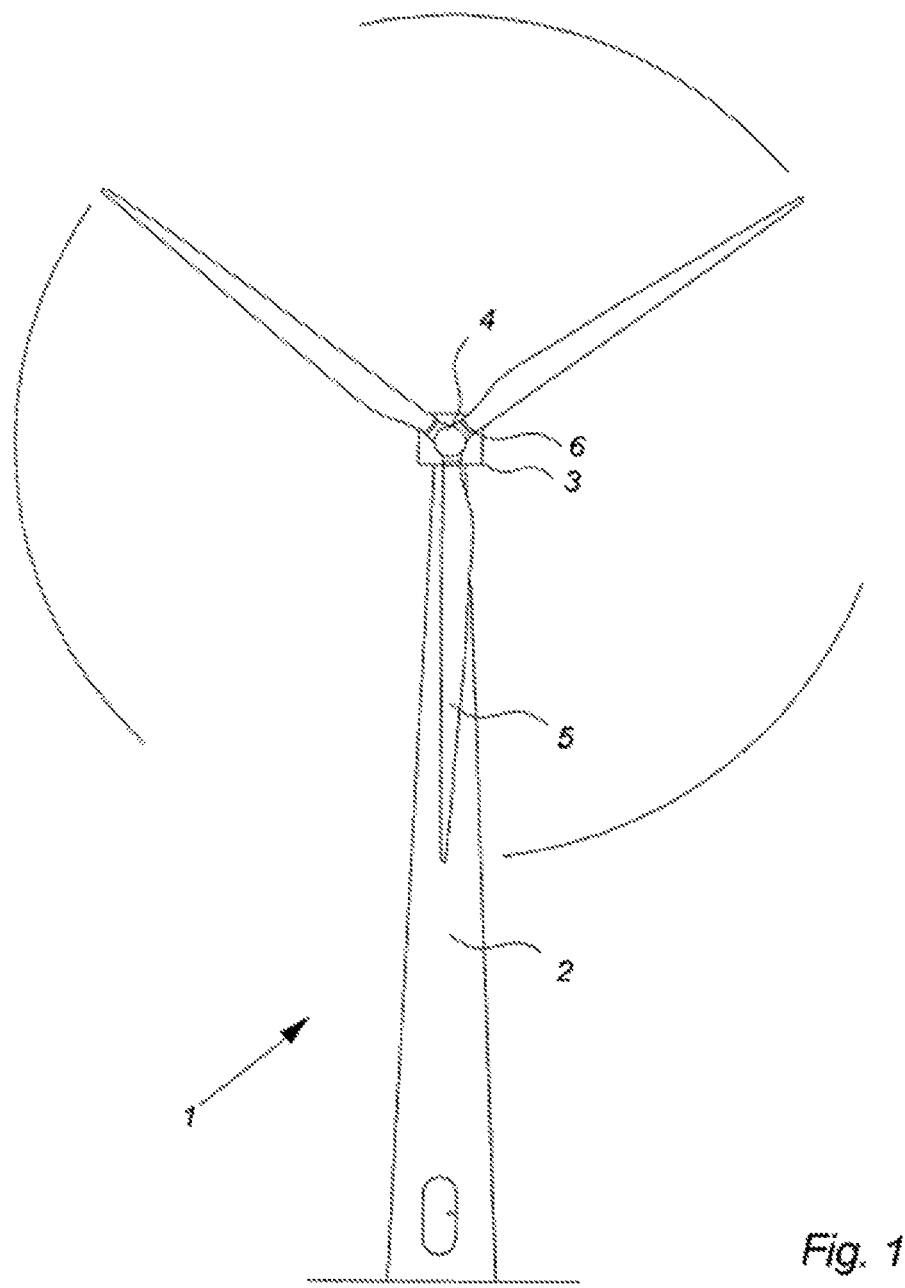
FIG. 1 illustrates a wind turbine comprising a tower, a nacelle, a rotor and blades attached to the rotor.

FIG. 1 illustrates a modern wind turbine 1 with a tower 2 and a wind turbine nacelle 3 positioned on top of the tower. The wind turbine rotor, comprising at least one blade such as three wind turbine blades 5 as illustrated, is connected to the hub 4 through pitch mechanisms 6. Each pitch mechanism includes a blade bearing and pitch actuating means which allows the blade to pitch. The blade bearing includes a blade flange at which the root end of the blade is fixed to the bearing.

Figure 2:
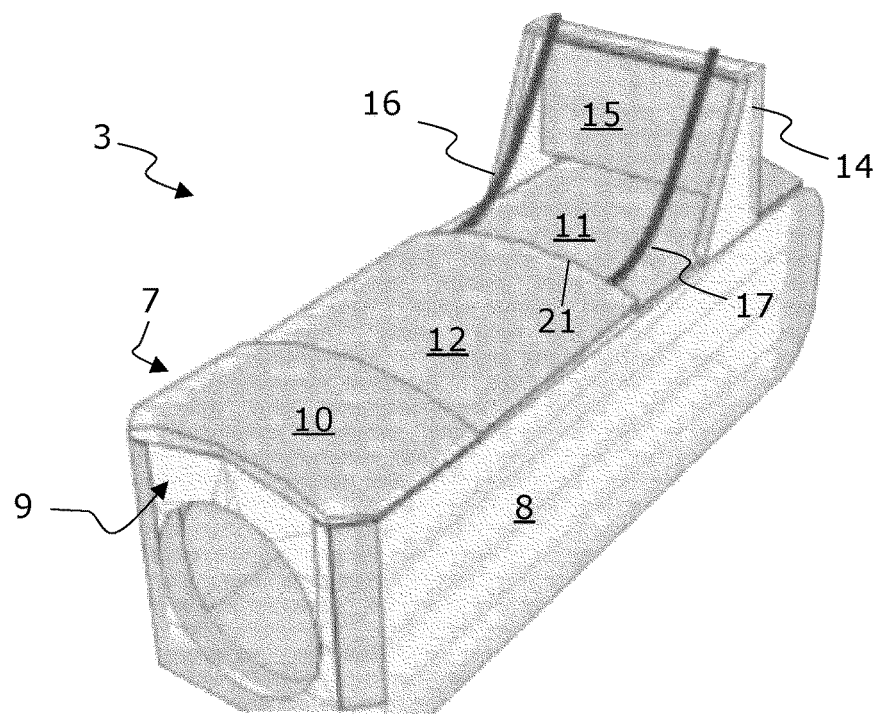
FIGS. 2-5 illustrate a sequence for providing tracks and guiding the closure from the closed to the open position.
Figure 3:
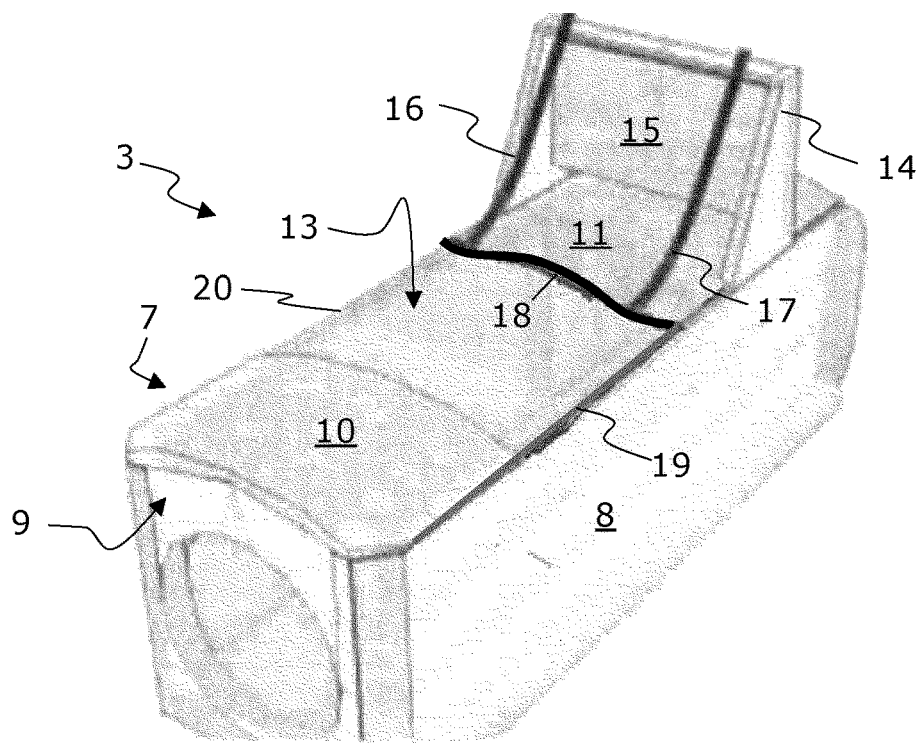

FIGS. 2 and 3 illustrate a perspective view of the nacelle 3 seen from above. In FIG. 2, the closure is in the closed position, and in FIG. 3, the closure is removed completely for illustrating the position of the track relative to the opening.

The nacelle forms first and second sidewalls 7, 8, a front wall 9, and a roof made from roof panels 10, 11 and a closure 12. The closure extends all the way between the first and second sidewalls 7, 8, covering an opening 13 having a width corresponding to the width of the nacelle.

The cooling arrangement 14 extends upwards from the roof. The cooling arrangement comprises a heat exchanger 15 arranged such that wind can pass unhindered through the heat exchanger and thus cool a fluid in the heat exchanger.

Two track sections 16, 17 extend in parallel from a first position adjacent to the opening and to a position atop of the cooling arrangement. The track sections form a first path along the outer surface of the roof panel 11 and a second path extending upwards. The two track sections extend from a position directly adjacent the edge 18 of the opening.

In the closed position, the closure is carried by the edges 19, 20 on opposite sides of the opening. When opening the closure, the task of carrying the closure is shifted from the edges 19, 20 to the track. Initially, the rear edge 21 of the closure moves upwardly (illustrated in FIG. 2), and then the closure is shifted backwardly whereby it is guided by the track. During the continued movement towards the open position, the closure rotates from the essentially horizontal orientation in which it covers the opening to the upward orientation where it covers the cooling arrangement. This is illustrated in FIGS. 4 and 5.

Figure 4:
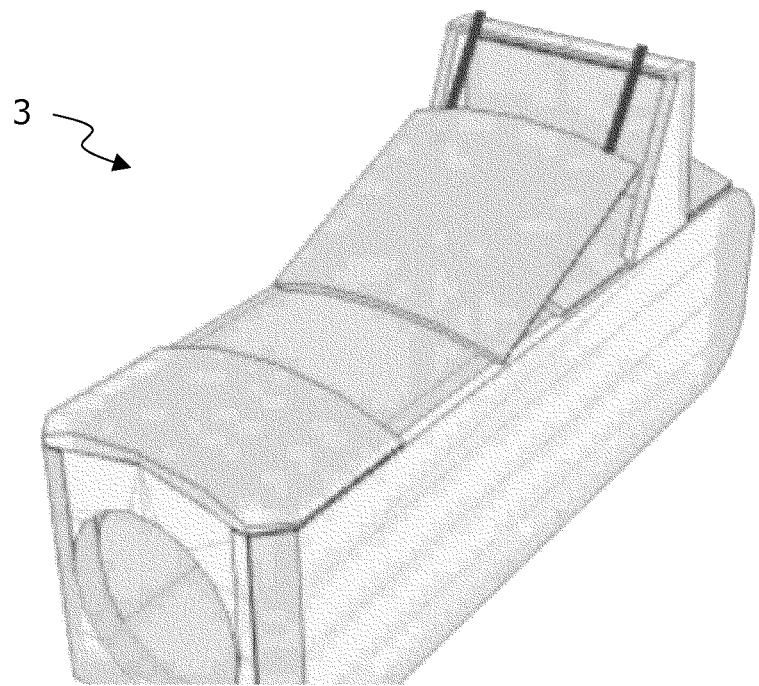
Figure 5:
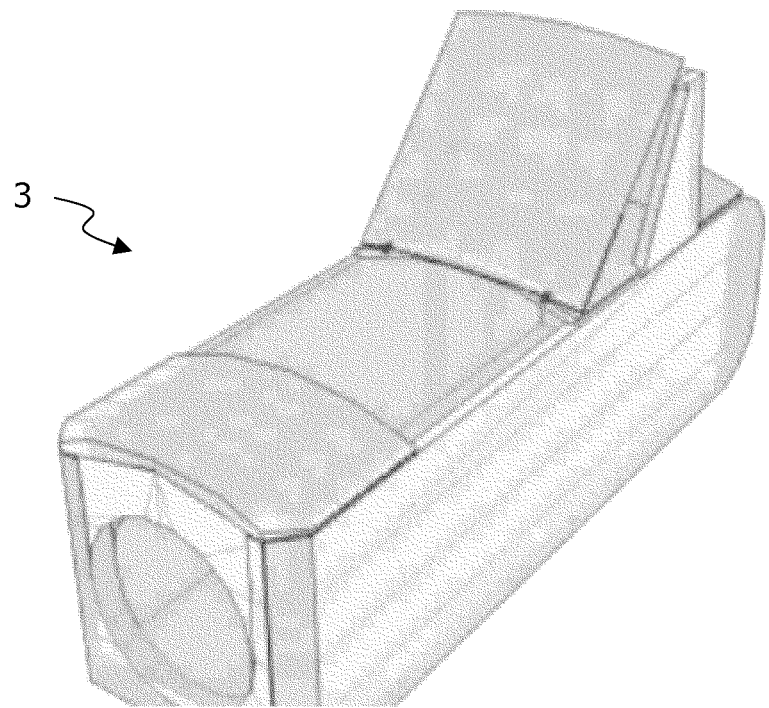

As indicated in FIGS. 3, 4, and 5, the track does not extend into the opening and item of a size corresponding to the internal width of the nacelle between inner surfaces of the sidewalls, can enter the opening. This is achieved by allowing the closure to rest on the sidewalls in the closed position.

Figure 6:
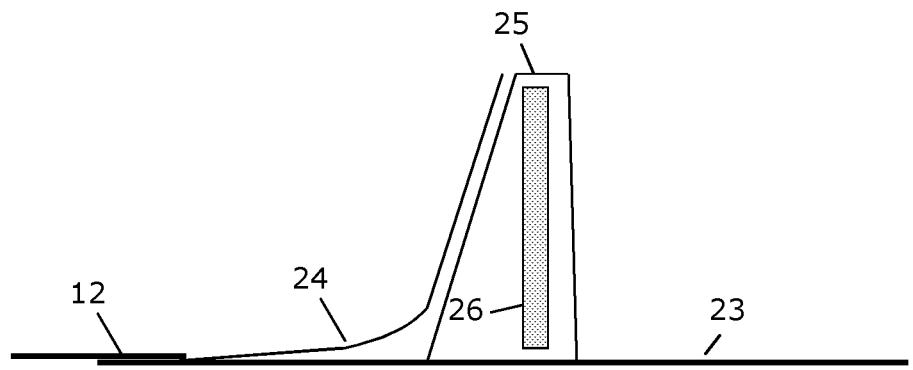
FIGS. 6 and 7 illustrate an embodiment where the track, a heat exchanger in the cooling arrangement and the roof panel forms a triangular shape with a base being shorter than the altitude.

FIG. 6 illustrates an embodiment where the track, a heat exchanger in the cooling arrangement and the roof panel forms a triangular shape with a base being shorter than the altitude. In FIG. 6, the closure 12 is guided along the roof 23 by the track 24. The track follows the contour of the cooling arrangement 25 which houses a heat exchanger 26. The track 24 is typically attached to the cooling arrangement such that the track and cooling arrangement support each other.

Figure 7:
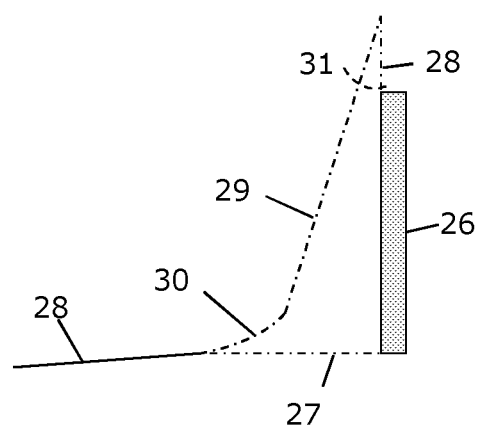

FIG. 7 illustrates by a dotted line, a contour of a triangle defined by the track 24, the heat exchanger, and the roof. The triangle has a base 27 and a altitude 28, and the base is shorter than the altitude.

The track 24 forms a first section 28, a second section 29 and a bended section 30 between the first and the second sections. The angle of the second section of the track relative to vertical is marked at 31 and is in the range of 5-25 degrees.

The invention claimed is:

1. A nacelle for a wind turbine, the nacelle comprising:
   a roof panel forming an opening into an internal space;
   a cooling arrangement extending upwards from the roof panel;
   a closure movable between an open position revealing the opening and a closed position closing the opening; and
   a track configured to guide the closure between the open and the closed positions,
   wherein the track is carried at least partly by the cooling arrangement.

2. The nacelle according to claim 1, wherein the track is configured to guide the closure such that it moves sideways in a horizontal plane and rotates about a horizontal axis.

3. The nacelle according to claim 1, wherein the sideways movement and the rotation are simultaneously occurring movements when the closure is guided by the track between the open and closed positions.

4. The nacelle according to claim 1, wherein the track has a first section extending essentially horizontally along an upper surface of the roof panel and a second section extending upwardly or downwardly along a rear surface or a side-surface of the nacelle or along a roof mounted cooler.

5. The nacelle according to claim 4, wherein the track has a curved section being between the first and second sections.

6. The nacelle according to claim 1, wherein the cooling arrangement comprises at least one heat exchanger, and wherein the distance from the track to the heat exchanger is larger at a position close to the roof panel than at a position further away from the roof panel.

7. The nacelle according to claim 1, wherein the closure is guided towards the cooling arrangement when moved from the closed to the open position.

8. The nacelle according to claim 1, wherein the closure at least partly covers a surface of the cooling arrangement in the open position.

9. The nacelle according to claim 1, wherein the nacelle forms a forward end with an opening for a rotor shaft to enter the nacelle and an opposite rearward end, the opening being between the cooling arrangement and the rearward end.

10. The nacelle according to claim 1, wherein the nacelle forms a forward end with an opening for a rotor shaft to enter the nacelle and an opposite rearward end, the opening being between the cooling arrangement and the forward end.

11. The nacelle according to claim 9, wherein the cooling arrangement is closer to the rearward end than to the forward end.

12. The nacelle according to claim 1, wherein the closure comprises a panel configured to cover the opening, and at least a first set of guides configured to follow the track and a second set of guides configured to follow the track, the first set of guides being offset from the second set of guides along the track, and the first and second set of guides being rotationally attached to the panel.

13. The nacelle according to claim 12, wherein at least one of the first set of guides and the second set of guides is slidingly attached to the panel.

14. The nacelle according to claim 1, comprising two side panels extending downwards at opposite side edges of the roof panel, and wherein the closure extends from one of the side panels to the other of the side panel.

15. The nacelle according to claim 14, wherein the closure comprises bend edge-portions extending along an outer surface of the side panels.

16. The nacelle according to claim 1, wherein the roof panel comprises two separate roof panel sections one opposite sides of the closure.

17. The nacelle according to claim 1, wherein the roof panel in the closed position is carried by an edge about the opening, and where the track extends from the edge in a direction away from the opening.

18. The nacelle according to claim 17, wherein the closure is carried by a first and a second side edge on opposite sides of the opening, and wherein the track comprise two track sections extending in parallel away from the opening, a distance between the two track sections being smaller than the distance between the first and second side edges.

19. The wind turbine comprising a nacelle according to claim 1.

20. A method for providing access to an internal space in a nacelle according to claim 1 of a wind turbine, the method comprising moving the closure from the closed position to the open position and thereby limiting an airflow across the cooling arrangement.

* * * * *